L. F. PETEY.
TIRE PROTECTOR.
APPLICATION FILED JUNE 13, 1919.
1,337,950.
Patented Apr. 20, 1920.
2 SHEETS—SHEET 1.
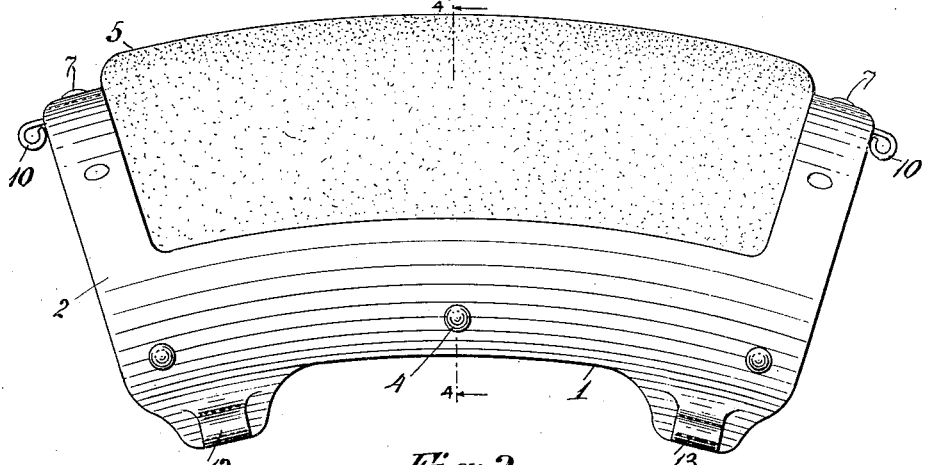
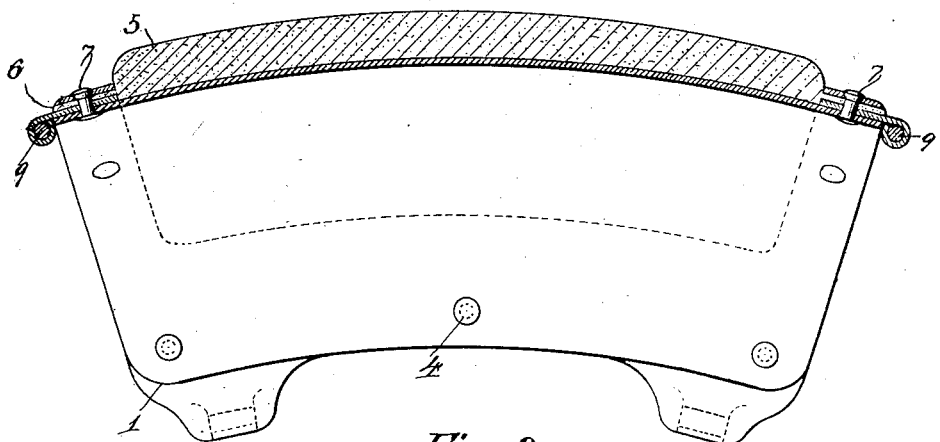
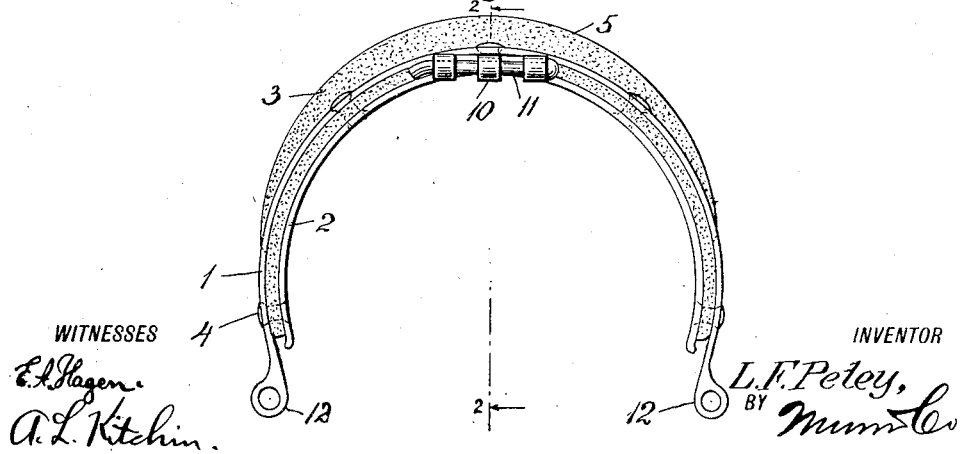
WITNESSES
E. A. Hagen
A. L. Kitchin
INVENTOR
L. F. Petey,
BY Munn & Co.
ATTORNEYS L. F. PETEY.
TIRE PROTECTOR.
APPLICATION FILED JUNE 13, 1919.
1,337,950.
Patented Apr. 20, 1920.
2 SHEETS—SHEET 2.
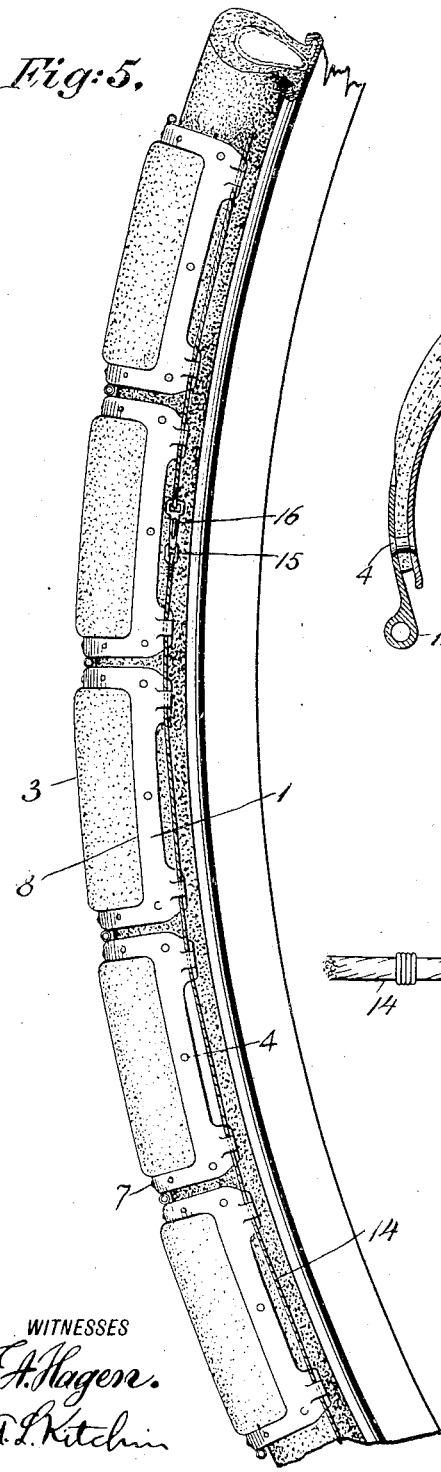
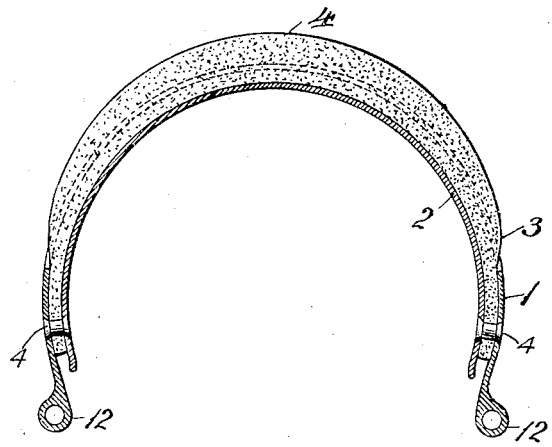
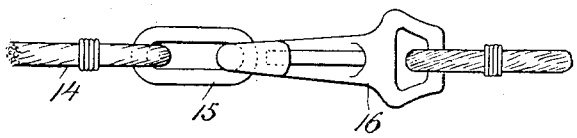
WITNESSES
E. A. Hagen.
A. L. Kitchin.
INVENTOR
L. F. Petey,
BY
ATTORNEYS

UNITED STATES PATENT OFFICE.

LOUIS F. PETEY, OF RHINELANDER, WISCONSIN.

TIRE-PROTECTOR.

1,337,950.   Specification of Letters Patent.   Patented Apr. 20, 1920.

Application filed June 13, 1919. Serial No. 303,960.

*To all whom it may concern:*

Be it known that I, LOUIS F. PETEY, a citizen of the United States, and a resident of Rhinelander, in the county of Oneida and State of Wisconsin, have invented a new and Improved Tire-Protector, of which the following is a full, clear, and exact description.

This invention relates to pneumatic tire protectors, and has for an object to provide an improved construction wherein the resiliency of the pneumatic tire is retained while a thorough protection against puncture is secured.

Another object of the invention is to provide a protector for pneumatic tires formed into a plurality of parts and connected together in such a manner that it will not interfere with the usual resilient action of the tire.

A further object of the invention is to provide a protector formed of a plurality of articulated units arranged to receive flexible side retaining elements.

In the accompanying drawings:

Figure 1 is a side view of one section of a tire protector, the same disclosing an embodiment of the invention.

Fig. 2 is a sectional view through Fig. 3 on line 2—2.

Fig. 3 is an end view of the construction shown in Fig. 1.

Fig. 4 is a transverse sectional view through Fig. 1 on line 4—4.

Fig. 5 is a fragmentary side view of a tire with an embodiment of the invention applied thereto.

Fig. 6 is a detail fragmentary side view of a cable connection embodying certain features of the invention.

Referring to the accompanying drawings by numerals 1 indicates a frame, 2 a supporting plate and 3 a tread member clamped to the supporting plate and frame 1, by any suitable means as for instance rivets 4. Three rivets have been shown on each side of the frame 1, but it will be evident that a larger or smaller number could be used without departing from the invention. From Fig. 2 it will be seen that both the frame 1 and the plate 2 are curved to fit the tire circumferentially. As illustrated in Fig. 3 the lower edges of the plate 2 and frame 1 are spaced apart slightly more than the diameter of the tire so as to allow the usual expansion of the tire when in use.

The plate 2 is preferably made from metal, as for instance a good grade of sheet metal whereby punctures and blow-outs are prevented. The frame 1 is also preferably steel and is cut out centrally for receiving the tread 5 of the tread member 3, the flanges 6 of the tread member extending between plate 2 and frame 1 so that the rivets 4 and 7 will pass therethrough. The rivets 7 at each end of each section 8 of the protector clamp a hinge plate 9 in place on the plate 2. These hinge plates are formed with interlocking knuckles 10 through which a suitable pin 11 extends, said pin being formed with a head on one end and slightly bent to one side on the opposite end in order that it will not come out when the protector is in use.

All the sections 8 are identical and when in use are arranged on a tire as shown in Fig. 5. In order to hold the device in place without interfering with its flexibility ears 12 and 13 are preferably cast or otherwise formed integral with the frame 1 on each side through which a flexible member, as for instance a steel cable 14 is arranged. This is provided with an elongated link 15 at one end and with a snap hook 16 at the opposite end whereby it may be easily applied and removed at any time. In regard to the material of which the protector is made it will, of course be understood that any suitable material may be used without departing from the spirit of the invention. As mentioned heretofore frame 1 and plate 2 are preferably constructed of steel while the tread member 3 may be constructed of rubber, rubber and canvas, canvas, leather or other yielding wearing material.

In operation a proper number of sections 8 are connected together to fit the tire. The sections may be connected together after having been fitted on the tire, or they may be connected together at any desired place and later fitted on the tire. After the connected sections are in proper place the two cables 14 are placed in position, if not already in position and hook 16 snapped into the link 15. By providing a construction of this kind the pneumatic tire is allowed to act freely. The use of a metallic surface placed over every part of the tread of the pneumatic tire renders it a puncture proof device so that an obstacle in the road can not get to the pneumatic tire to injure it in any way. Also the wear and tear of the road is thrown on the protector thereby saving the pneumatic tire. When the tread member 3 becomes worn the rivets 4 and 7 are cut off, the tread member removed and a new one substituted.

What I claim is:

1. A pneumatic tire protector comprising a plurality of sections, each section comprising a metallic base plate arc-shaped in cross section and circumferentially arc-shaped, a flexible tread member having substantially the characteristics of rubber positioned on the base plate, said tread member being formed with a projecting flange at each end and each side, a frame formed with an opening through which said tread member projects, said frame fitting against said flanges, a plurality of securing rivets extending through said base plate, said frame and the flanges of said tread for clamping all the parts together, and means on the frame for receiving retaining members for holding the frame and associate parts on the tire.

2. A pneumatic tire protector comprising a plurality of sections, each section comprising a base plate adapted to fit against the tire, a yielding tread member having a plurality of flanges and an upstanding thickened portion, said flanges and one face of the thickened portion fitting against said base plate, a retaining frame member having an opening therein through which the thickened portion of the tread projects, said frame fitting flatwise against said flanges, a plurality of rivets extending through said base plate, said frame and said flanges for rigidly clamping all three of said members together, and means arranged on said frame for receiving retaining members for holding the frame and associate parts on a tire.

LOUIS F. PETEY.